United States Patent
Baer et al.

(10) Patent No.: US 7,523,550 B2
(45) Date of Patent: Apr. 28, 2009

(54) PROCESS TO OPEN CONNECTION VIAS ON A PLANARIZED SURFACE

(75) Inventors: Amanda Baer, Campbell, CA (US); Hamid Balamane, Palo Alto, CA (US); Michael Feldbaum, San Jose, CA (US); Ming Jiang, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 193 days.

(21) Appl. No.: 11/411,555

(22) Filed: Apr. 25, 2006

(65) Prior Publication Data

US 2007/0245557 A1    Oct. 25, 2007

(51) Int. Cl.
*H01K 3/10* (2006.01)
(52) U.S. Cl. ............... 29/852; 29/603.07; 29/837; 29/845; 29/854; 205/119; 205/122; 360/121; 360/122; 360/317; 427/127; 427/128
(58) Field of Classification Search . 29/603.13–603.16, 29/603.18, 837, 845, 852, 854; 205/119, 205/122; 360/122, 317; 427/127, 128
See application file for complete search history.

(56) References Cited

U.S. PATENT DOCUMENTS

| | | | |
|---|---|---|---|
| 4,855,854 A | 8/1989 | Wada et al. | 360/126 |
| 4,856,181 A | 8/1989 | Pichler et al. | 29/603 |
| 4,881,144 A | 11/1989 | Yuito et al. | 360/125 |
| 4,943,882 A | 7/1990 | Wada et al. | 360/126 |
| 5,155,646 A | 10/1992 | Fujisawa et al. | 360/126 |
| 5,279,990 A * | 1/1994 | Sun et al. | 438/672 |
| 5,567,270 A * | 10/1996 | Liu | 438/701 |
| 5,657,192 A | 8/1997 | Cohen et al. | 360/126 |
| 5,835,313 A | 11/1998 | Sato et al. | 360/113 |

(Continued)

FOREIGN PATENT DOCUMENTS

JP     1039614     2/1989

(Continued)

OTHER PUBLICATIONS

Kawabe et al., "Fabrication of Thin Film Inductive Heads With Top Core Separated Structure" IEEE Transactions on Magnetics, vol. 27, No. 6 Nov. 1991:4936-4938.

(Continued)

*Primary Examiner*—Paul D Kim
(74) *Attorney, Agent, or Firm*—Zilka-Kotab, PC

(57) ABSTRACT

A method for forming a via in an alumina protective layer on a structure such as a magnetic write head for use in perpendicular magnetic recording. A structure such as a magnetic pole, and or magnetic trailing shield, is formed over a substrate and is covered with a thick layer of alumina. The alumina layer can then be planarized by a chemical mechanical polishing process (CMP) and then a mask structure, such as a photoresist mask, is formed over the alumina layer. The mask structure is formed with an opening disposed over the contact pad. A reactive ion mill is then performed to remove portions of the alumina layer that are exposed at the opening in the mask, thereby forming a via in the alumina layer.

8 Claims, 12 Drawing Sheets

U.S. PATENT DOCUMENTS

| | | | |
|---|---|---|---|
| 6,006,764 A * | 12/1999 | Chu et al. | 134/1.2 |
| 6,271,117 B1 * | 8/2001 | Cherng | 438/624 |
| 6,576,542 B2 * | 6/2003 | Ahn | 438/619 |
| 6,605,196 B2 | 8/2003 | Sasaki | 204/192.12 |
| 6,697,221 B2 | 2/2004 | Sato et al. | 360/126 |
| 2003/0231426 A1 | 12/2003 | Sato | 360/126 |
| 2005/0172479 A1 | 8/2005 | Sasaki | 29/603.16 |
| 2005/0193550 A1 | 9/2005 | Guthrie et al. | 29/603.14 |
| 2005/0286169 A1 | 12/2005 | Baer et al. | 360/123 |

FOREIGN PATENT DOCUMENTS

| | | |
|---|---|---|
| JP | 6084141 | 3/1994 |

OTHER PUBLICATIONS

Kawabe et al., "Selective Ion Beam Etching of $Al_2O_3$ Films" J. Electrochem. Soc., vol. 138, No. 9 Sep. 1991:2744-2748.

Jayasekara et al., "A Reactive Ion Milling Process For Patterning Narrow Track Iron Nitride Recording Head Poles At the Wafer Level" IEEE Transactions on Magnetics, vol. 33, No. 5 Sep. 1997:2830-2832.

Copy of Chinese Office Action Summary from Chinese Application No. 200710101871.2 received on Jan. 22, 2009.

* cited by examiner

PROCESS TO OPEN CONNECTION VIAS ON A PLANARIZED SURFACE

FIELD OF THE INVENTION

The present invention relates to the manufacture of magnetic write heads and more particularly to a process for forming connection vias on a perpendicular write head that does not leave voids or seams and which provides a well defined via.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first and second insulation layers, the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (API) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "can't" the write field being emitted from the write pole. Canting the write field at an angle relative to the normal of the medium makes the magnetic moment of the medium easier to switch by reducing the switching field. Modeling has shown that a single pole writer in a perpendicular recording system can exhibit improved transition sharpness (i.e. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

After a write pole and trailing shield (if one has been included) have been constructed, a protective layer, such as a layer of alumina is deposited over the write head. However, in order to make electrical contact with the electrically conductive write coil disposed beneath the protective alumina layer, a hole (or via) must be provided in the protective alumina layer to open up a contact pad for the underlying coil.

These vias are usually formed by a lift off process. A bi-layer photoresist mask is formed to cover the area where the via is to be formed. Then, the layer of alumina is deposited full film. After the alumina layer is deposited, the photoresist mask is lifted off, such as by a chemical lift off process. The bi-layer structure of the photoresist facilitates lift off by providing an opening at the edge of the mask that is not completely covered with alumina so that the lift-off chemicals can reach the resist and lift off the mask.

Unfortunately, such lift-off processes present challenges when used to form vias, especially in very small structures. For example, in order for the lift-off process to work properly, the alumina layer must be deposited by a deposition process that deposits at a relatively low rate, and can't be deposited too thick so as to avoid completely covering the mask which would prevent lift-off chemicals from reaching beneath the mask. Deposition processes that are acceptable for use with such lift off processes tend to form voids or seams when deposited over tall topographies such as a write pole or a trailing shield. These voids can be exposed at the air bearing surface (ABS) after lapping. Such voids, then, accumulate debris during use, resulting in failure of the recording system.

Therefore, there is a strong felt need for manufacturing method that can provide contact vias through a hard, electrically insulating, non-magnetic layer such as an alumina layer deposited over a tall topography such as a write head or a trailing shield. Such a method would preferably allow such non-magnetic, electrically conductive layer to be deposited by a method that does not produce voids or seams when deposited over tall topographies.

SUMMARY OF THE INVENTION

The present invention provides a method for forming a via in a structure such as an alumina protective layer of a write head. The method involves depositing a layer of material such as alumina over substrate and then forming a mask structure over the alumina layer. The mask is configured with an opening for defining a via. A reactive ion mill (RIM) is then performed to remove portions of the alumina layer that are exposed at the opening in the mask, thereby forming a via in the alumina layer. The mask structure can then be removed and an electrically conductive material can be deposited into the via.

The electrically conductive material can be, for example copper (Cu) and can be deposited by a process that includes first sputter depositing an electrically conductive seed layer, forming another mask having an opening at the via, and then electroplating an electrically conductive material. Remaining unwanted seed layer material can be removed by a process such as sputter etching.

The alumina layer can be polished by chemical mechanical polishing (CMP) prior to forming the mask structure.

The subtractive via formation process of the present invention advantageously allows the alumina to be deposited by a method that does not result in the formation of any voids or seams. For example, the alumina can be deposited thick by a process having a high deposition rate. Such processes do not cause voids or seams such as areas experienced with deposition processes used in a lift off via formation process as practiced in the prior art.

Furthermore, the use of reactive ion milling (RIM) advantageously allows the vias to be formed with well defined, substantially vertical side walls. Other material removal processes such as dry or wet etching cause the opening formed in the alumina layer to flare out toward the top of the opening. Such spreading would cause the opening of various vias to open into one another, resulting in shorting between various electrical components and vias.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
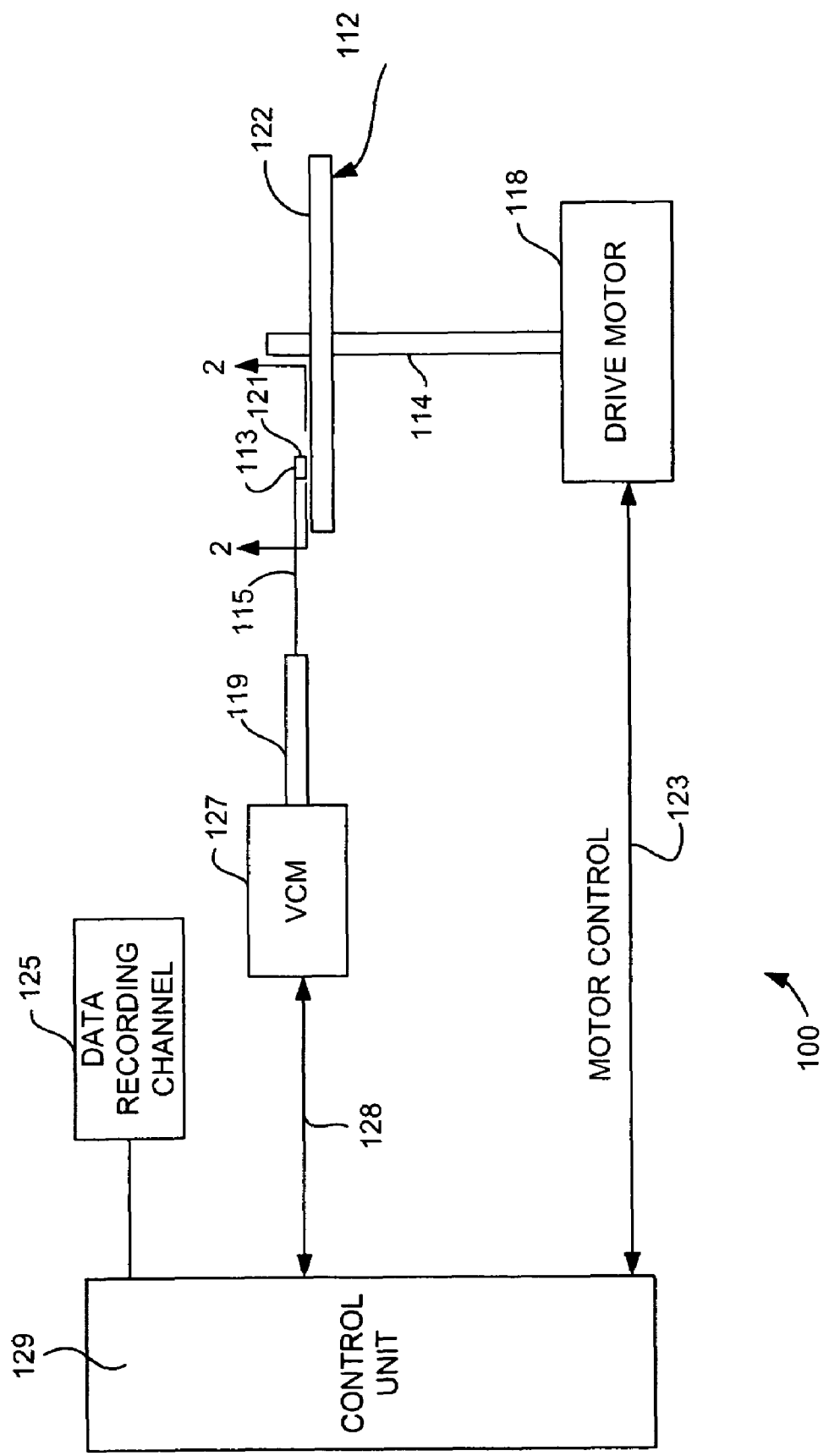
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
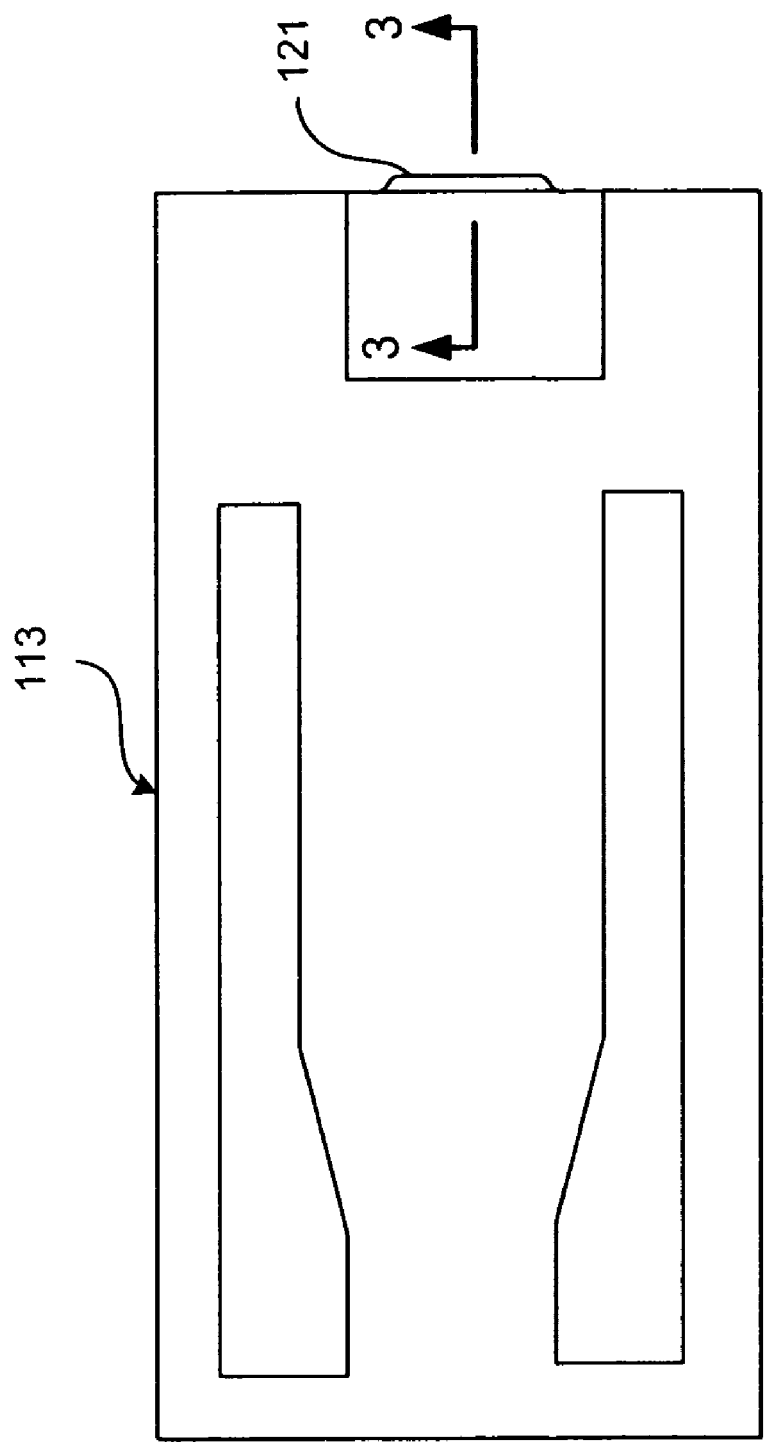
FIG. 2; is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
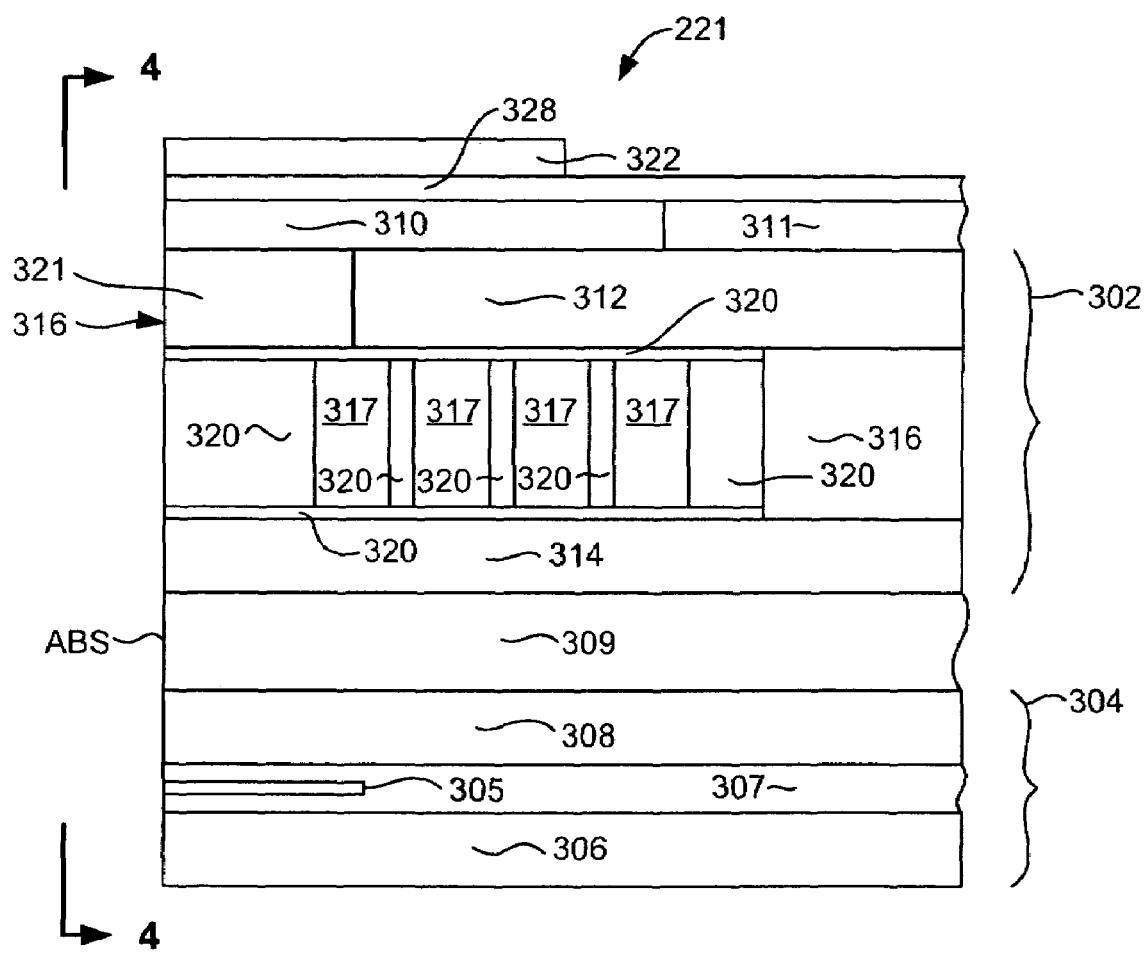
FIG. 3 is a cross sectional view of a magnetic head taken from line 3-3 of FIG. 2, enlarged, and rotated 90 degrees counterclockwise.

With reference now to FIG. 3, the magnetic head 221 for use in a perpendicular magnetic recording system is described. The head 221 includes a write element 302 and a read element 304. The read element 304 includes a read sensor 305, which is preferably a giant magnetoresistive (GMR) sensor and is preferably a current perpendicular to plane (CPP) GMR sensor. CPP GMR sensors are particularly well suited for use in perpendicular recording systems. However, the sensor 304 could be another type of sensor such as a current in plane (CIP) GMR sensor or, a tunnel junction sensor (TMR) or some other type of sensor. The sensor 304 is located between and insulated from first and second magnetic shields 306, 308 and embedded in a dielectric material 307. The magnetic shields, which can be constructed of for example CoFe or NiFe, absorb magnetic fields, such as those from up-track or down-track data signals, ensuring that the read sensor 304 only detects the desired data track located between the shields 306, 308. A non-magnetic, electrically insulating gap layer 309 may be provided between the shield 308 and the write head 302.

Figure 4:
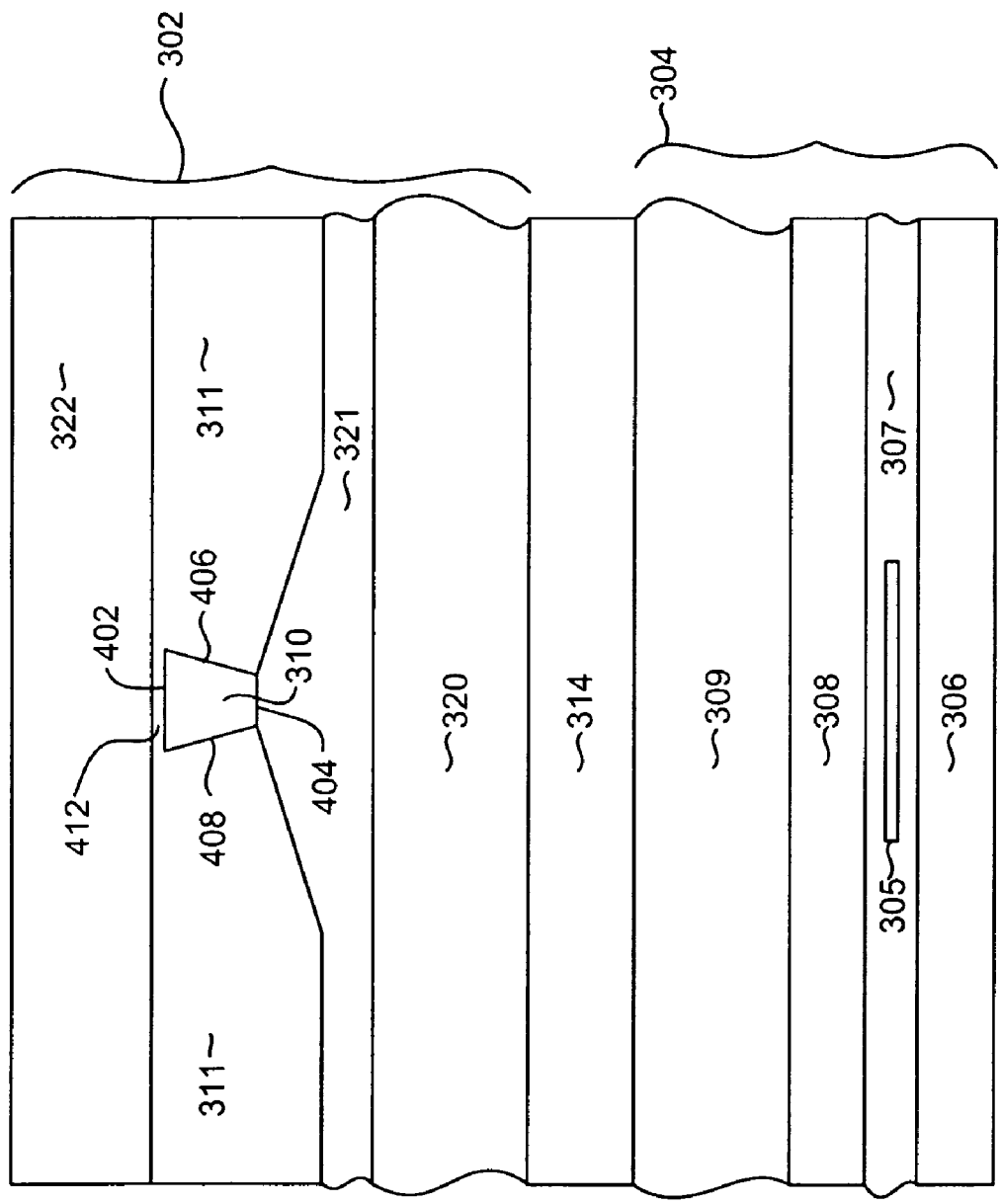
FIG. 4 is an ABS view, taken from line 4-4 of FIG. 3 and rotated 180 degrees, of a magnetic head according to an embodiment of the present invention.

With continued reference to FIG. 3, the write element 302 includes a write pole 310 that is magnetically connected with a magnetic shaping layer 312, and is embedded within an insulation material 311. As shown in FIG. 4, the write pole 310 has a small cross section at the air bearing surface and is constructed of a material having a high saturation moment, such as NiFe or CoFe. The write element 302 also includes return pole layer 314 that is constructed of a magnetic material such as CoFe or NiFe and has which a cross section parallel to the ABS surface that is significantly larger than that of the write pole 310 as shown in FIG. 4. The return pole 314 is magnetically connected with the shaping layer 312 by a back gap portion 316 as shown in FIG. 3. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field 321 to be emitted toward an adjacent magnetic medium. The shaping layer 312 is also surrounded by an insulation layer 321 which separates the shaping layer 312 from the ABS. The insulation layers 320, 321, 311 can all be constructed of the same material, such as alumina ($Al_2O_3$) or of different electrically insulating materials.

The write head element 302 may also include a trailing shield 322. With reference to FIG. 4, the write pole 310 has a trailing edge 402 and a leading edge 404. The terms trailing and leading are with respect to the direction of travel along a data track when the write head 302 is in use. The write pole 310 also preferably has first and second laterally opposing sides 406, 408 that are configured to define a width at the leading edge 404 that is narrower than the width at the trailing edge 402, forming a write pole 310 having a trapezoidal shape. This trapezoidal shape is useful in preventing adjacent track writing due to skew of the write head 302 when the head 302 is located at extreme outer or inner positions over the disk. However, this trapezoidal shape of the write head 310 is not necessary to practice the present invention.

With continued reference to FIG. 4, the magnetic trailing shield 322 (if one is provided) is separated from the write pole 310, by a trailing gap 412, which is filled with a non-magnetic material such as Rh or alumina. The trailing shield gap is constructed of a thickness to provide a desired amount of write field canting, while not causing too much field to leak to the shield 322 which would result in a loss of write field performance. The trailing shield 322 can be constructed of a magnetic material such as NiFe.

With reference now to FIGS. 5-11 a method of forming vias is described that provides well defined vias for making contact with electrical structures such as the coil 317, while avoiding the formation of voids in the alumina layer. It should be pointed out that, while this method is described with reference the formation of vias in a perpendicular magnetic write head, it could also be applied to the formation of vias in any number of other structures or products formed on a wafer. Also, while the FIGS. 5-11 describe the formation of an alumina layer over the write pole 310, it also applies to the formation of alumina over a structure that includes a trailing shield.

Figure 5:
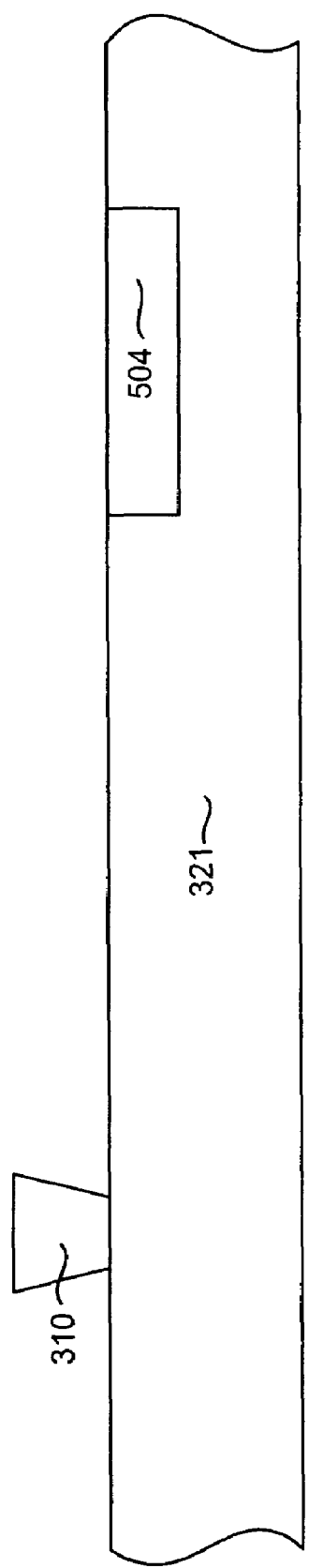
FIGS. 5-11 are ABS views of a portion of a magnetic write head structure illustrating a method of forming vias according to an embodiment of the invention.

With particular reference to FIG. 5, a substrate is provided, which may be an alumina layer 321, shaping layer or any other substrate. A structure such as a magnetic pole 310 is formed over the substrate. A contact pad 504 is formed in the substrate, and may be an electrically conductive contact pad for providing an electrical current to the coil 317. This is by way of example, however, and the pad 504 could be any structure to which via access is needed through a layer such as an alumina layer.

Figure 6:
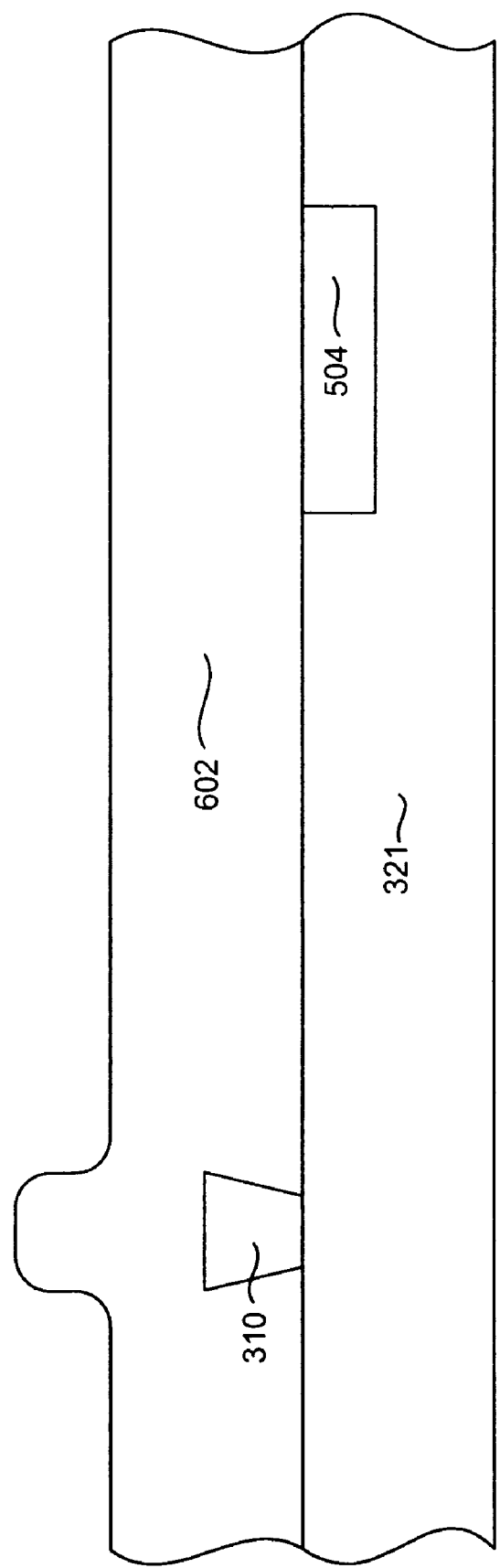

With reference to FIG. 6, a layer of alumina 602 is deposited over the substrate 321 pole 310 (or other structure) and pad 504. Because the via formation process of the present invention is a subtractive process, the alumina layer can be deposited thick and at a high deposition rate, by a deposition method that does not create voids or seems such as at the sides of the pole 310. As mentioned in the Background of the Invention, prior art lift off processes used to form vias limited the alumina deposition to processes that tend to form voids and/or seams at the sides of the poles. This is because the lift off process required that the alumina be deposited in thin layers at a somewhat slow deposition rate in order to avoid completely covering the bi-layer mask with alumina. Covering the bi-layer mask with a thick layer of alumina that completely closed off the mask would preclude lifting off the mask by chemical lift-off. Therefore, the subtractive via process according to the invention, which allows desired alumina deposition methods to be employed, advantageously prevents such voids and seams.

Figure 7:
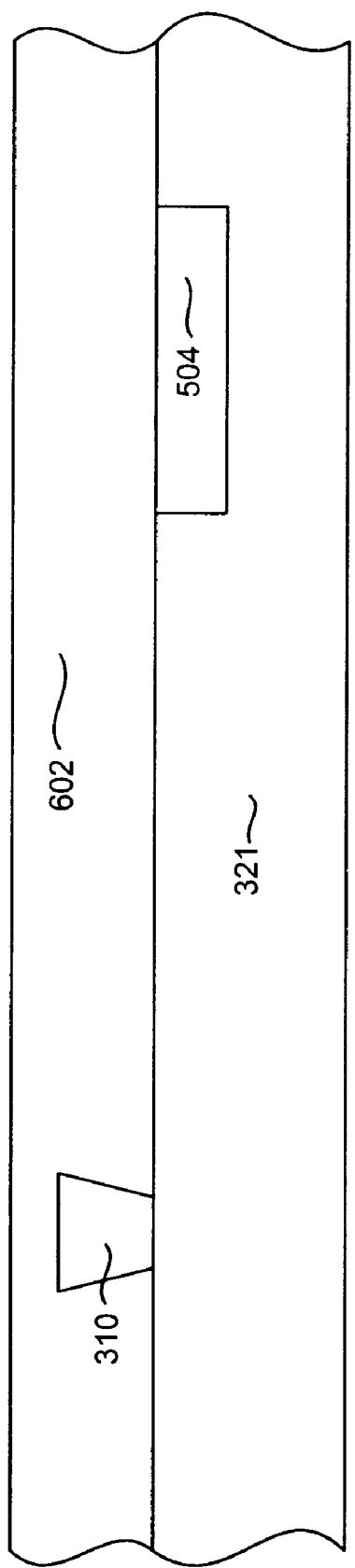
Figure 8:
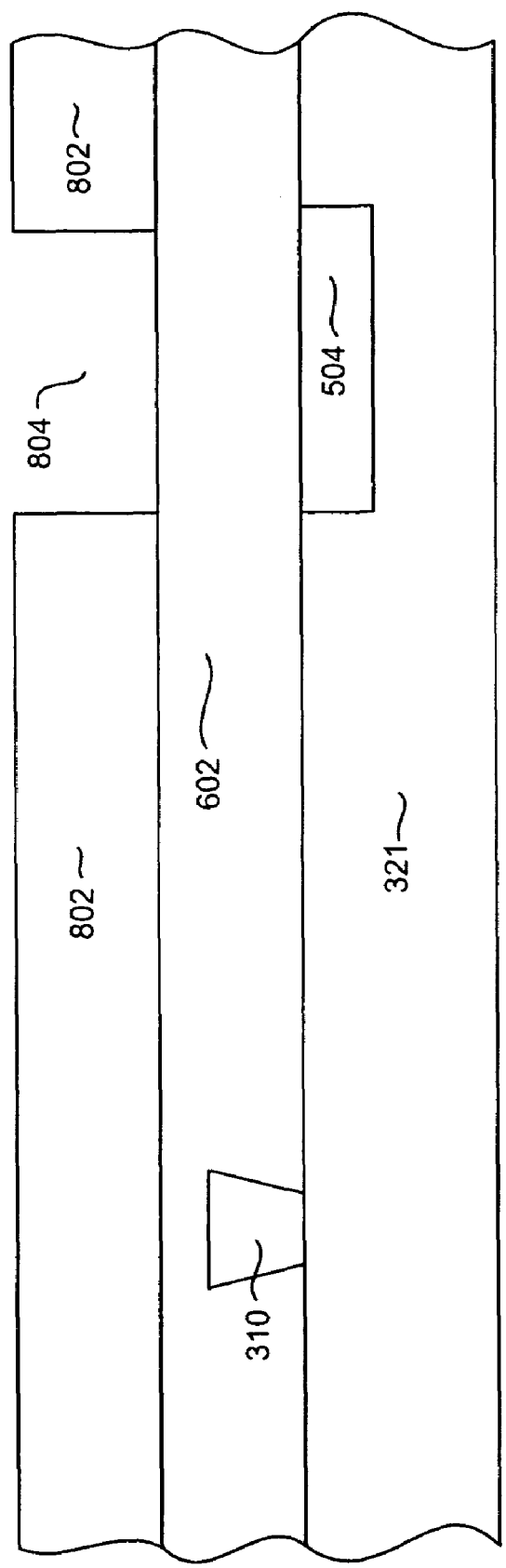

With reference now to FIG. 7, a chemical mechanical polishing process (CMP) can be employed to planarize the alumina layer 602, resulting in a smooth flat surface on the alumina layer 602. Then, with reference to FIG. 8 a mask structure 802 having an opening 804 at a desired via location is formed. The mask may be constructed of photoresist, electron beam (e-beam) resist or some similar mask material. The mask may also include one or more image transfer layers such as a layer of SiO$_2$ or some other hard mask and a soluble polyimide solution such as DURIMIDE®.

Figure 9:
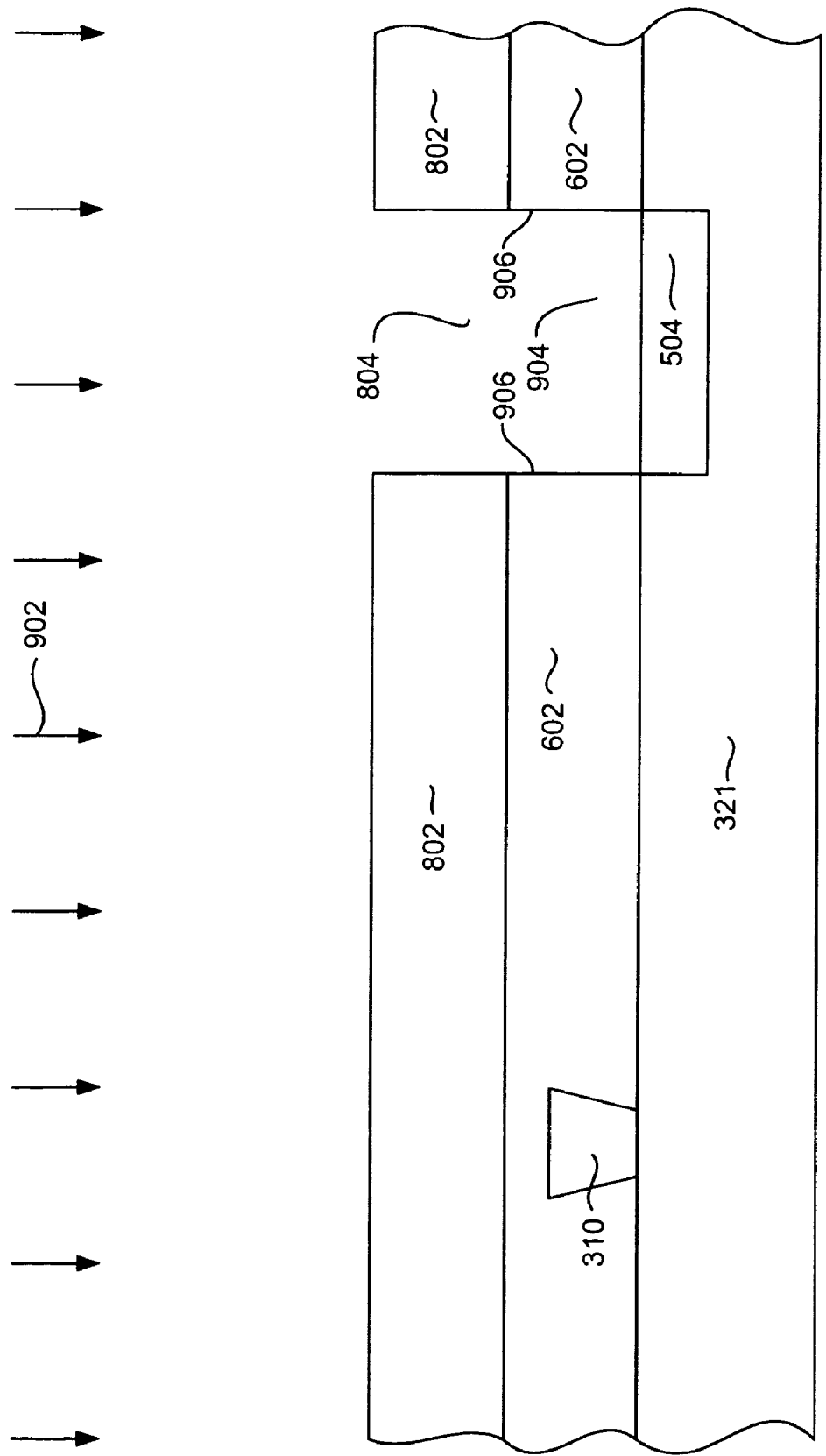

With reference now to FIG. 9 a reactive ion mill 902 is performed to remove portions of the alumina layer that are exposed at the opening 804, forming an opening, or via, 904 in the alumina layer. It should be pointed out that the reactive ion mill (RIM) (which involves a chemical species, such as CHF3, that preferentially etches alumina relative to the other layers) is a directional process that causes the alumina material to be removed in a substantially vertical manner resulting in the via 904 being formed with substantially vertical side walls 906. If another material removal process was used, such as wet etching, the material would not be removed in such a substantially vertical manner, the resulting via formed would tend to flare out at the top being wider at the top than at the bottom. Where such structures need to be formed close together, this would result in various electrical structures such as various contact pads being shorted to one another. This would, of course, be unacceptable. Therefore, the ion milling process 902 allows the vias to be formed with high resolution and high density without shorting.

Figure 10:
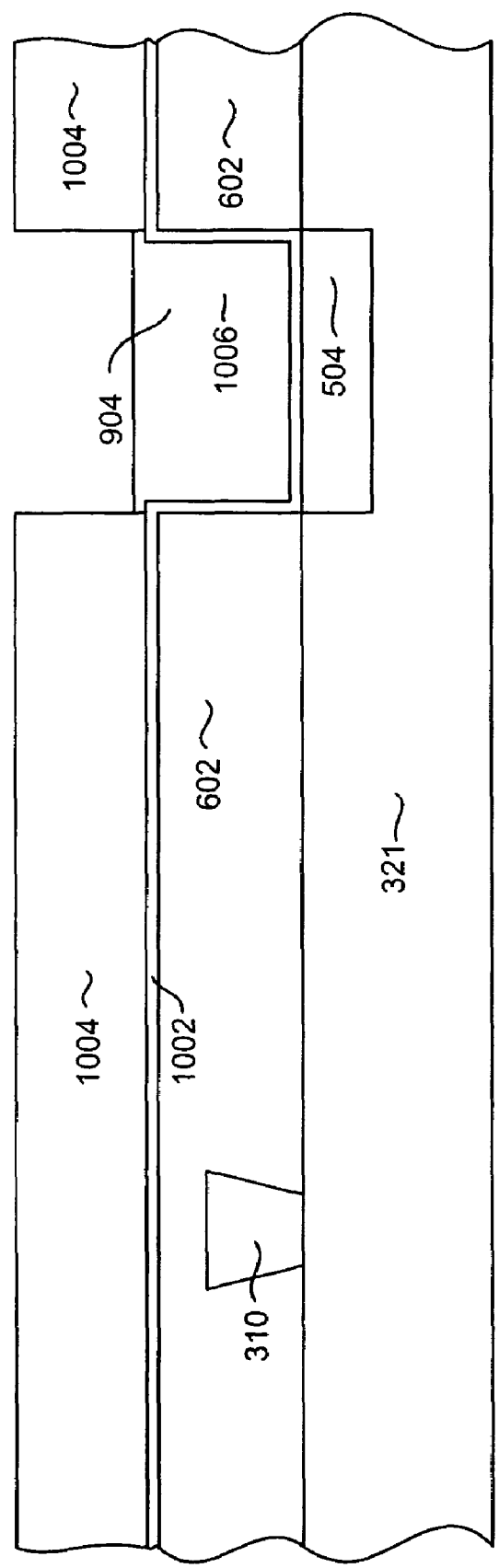

With reference now to FIG. 10, the mask layer 802 is lifted off. This can be performed, for example, by an ash and strip process. An electrically conductive seed layer 1002 can then be deposited. The electrically conductive seed material 1002 can be, for example, Cu and can be deposited by sputter deposition. Another mask structure 1004 can be formed. This mask structure can be a mask the defines other features such as electrically conductive straps and connectors (not shown) in other regions of the wafer, in addition to having an opening over the via 904. Then, an electrically conductive material 1006 such as Cu can be deposited by electroplating, using the seed 1002 to initiate the electroplating process.

Figure 11:
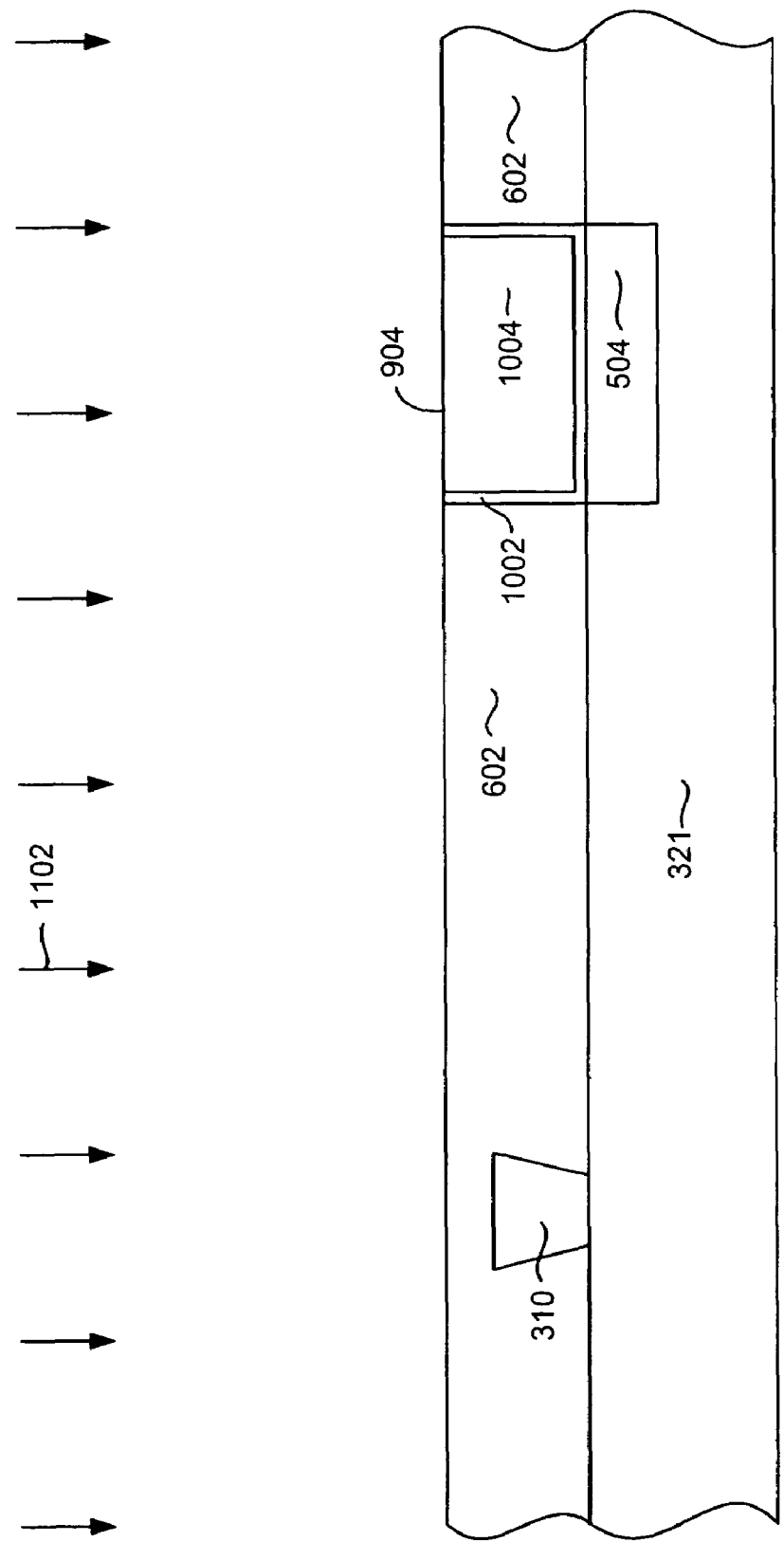

With reference now to FIG. 11, the mask 1004 can be lifted off, such as by an ash and strip process as described above, or by some other process. Then, a sputter etch 1102 can be used to remove remaining portions of the seed layer outside of the via 904.

Figure 12:
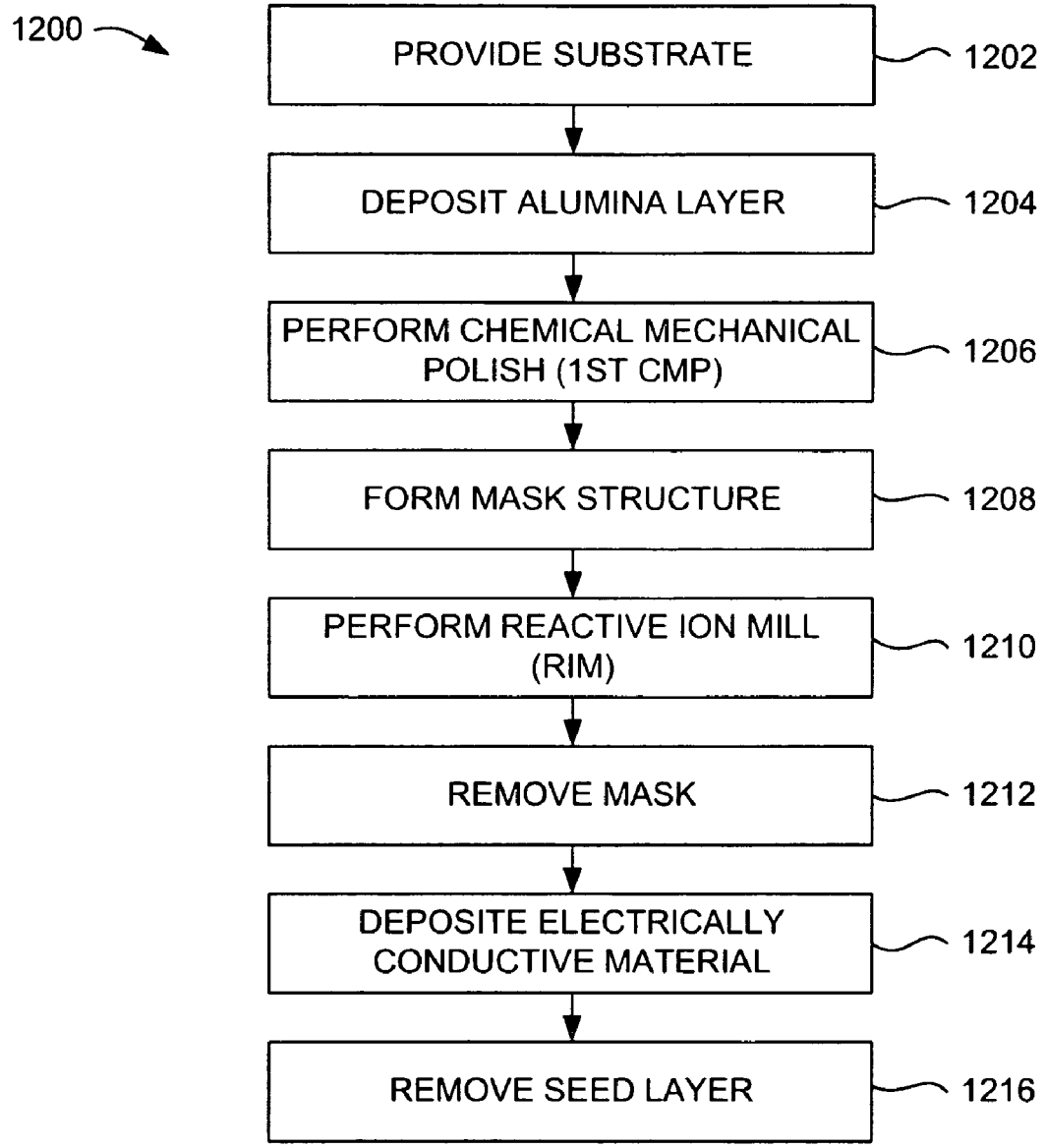
FIG. 12 is a flow chart summarizing a method of forming vias in a structure according to an embodiment of the invention.

With reference now to FIG. 12, a method 1200 for forming a via in a write head as described above is summarized. In a step 1202, a substrate is provided. This substrate may have a structure such as a write pole and/or a trailing magnetic shield. The substrate also has a contact area where a via will be needed. This could be an electrical contact such as for a write coil. Then, in a step 1204, a layer of material such as alumina is deposited full film. This material (which will be referred to as an alumina layer, although it could be some other material) is deposited in such a manner that it will be deposited with little or no seams or voids.

In a step 1206 a chemical mechanical polish can be performed to planarize the surface of the alumina layer just deposited. This chemical mechanical polish (CMP) is optional, however, performing this CMP provides a desirable flat surface for future photolithography. Then, in a step 1208 a mask is formed having an opening where a desired via is to be located. The mask can be formed by spinning on a resist layer such as a photoresist or e-beam resist and then photolithographically patterning and developing the resist layer. Then in a step 1210 a reactive ion mill (RIM) is performed to remove portions of the alumina layer that are exposed through the opening in the photoresist mask to form an opening or via in the alumina layer. The RIM process forms a well defined via having substantially vertical side walls. Then, in a step 1212 the photoresist mask can be lifted off, such as by ash and strip, chemical liftoff, etc.

With continued reference to FIG. 12, in a step 1214 an electrically conductive material can be deposited into the via. The depositing of the electrically conductive material into the via can include sputter depositing an electrically conductive seed layer. Then, a second mask having an opening at the location of the via can be formed and an electroplating process can be used to fill the via with an electrically conductive material such as Cu. The mask can then be removed, and in a step 1216 the remaining seed layer outside of the via can be removed by sputter etching or some other process.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for forming a via in a structure, comprising:
   providing a substrate;
   depositing an electrically insulating layer;
   forming a first mask structure over the electrically insulating layer, the first mask structure having an opening configured to define a via;
   performing a reactive ion mill to remove portions of the electrically insulating layer that are not protected by the mask; and
   depositing an electrically conductive material, into the via wherein the depositing the electrically conductive material comprises sputter depositing an electrically conductive seed layer, forming a second mask structure having an opening at the via, electroplating the electrically conductive material into the via, removing the second mask structure, and removing the remaining portion of the seed layer outside of the via.

2. The method as in claim 1, further comprising, after performing the reactive ion mill, removing the first mask structure.

3. The method as in claim 1 wherein the first mask structure is a photoresist mask, the method further comprising, after performing the reactive ion mill (RIM) performing an ash and strip to remove the photoresist mask.

4. A method for forming a via in a structure, comprising:

providing a substrate, the substrate having an electrically conductive contact pad formed therein;

forming a structure on the substrate the structure having a topography;

depositing a layer of alumina over the substrate and structure, the alumina being deposited by a deposition process that deposits the alumina at a sufficiently high deposition rate to avoid the formation of voids in the alumina layer;

performing a chemical mechanical polishing process (CMP) to form the alumina layer with a substantially planar surface;

forming a first mask structure over the alumina layer, the first mask structure having an opening configured to define a via;

performing a reactive ion mill to remove portions of the alumina layer that are exposed at the opening the first mask structure, thereby forming the via in the alumina layer;

removing the first mask structure; and depositing an electrically conductive material, into the via wherein the the depositing the electrically conductive material further comprises sputter depositing an electrically conductive seed layer, forming a second mask structure having an opening at the via, electroplating the electrically conductive material, into the via removing the second mask structure and removing at least a portion of the seed layer outside of the via.

5. The method as in claim 4 wherein the opening in the mask is disposed over the electrically conductive contact pad, and wherein the reactive ion mill (RIM) is performed sufficiently to expose the electrically conductive contact pad.

6. The method as in claim 4 wherein the electrically conductive material comprises copper (Cu).

7. The method as in claim 4 wherein the first mask comprises a photoresist material that has been photolithographically patterned and developed.

8. The method as in claim 4 wherein the first mask structure is a photoresist mask and the first mask structure is removed by a process that includes an ash and strip process.

\* \* \* \* \*